United States Patent [19]

Ganzel

[11] Patent Number: 5,542,253

[45] Date of Patent: Aug. 6, 1996

[54] VEHICULAR BRAKING SYSTEM HAVING A LOW-RESTRICTION MASTER CYLINDER CHECK VALVE

[75] Inventor: Blaise J. Ganzel, Ann Arbor, Mich.

[73] Assignee: Kelsey-Hayes Company, Livonia, Mich.

[21] Appl. No.: 391,218

[22] Filed: Feb. 21, 1995

[51] Int. Cl.⁶ .................................................. B60T 11/20
[52] U.S. Cl. ................................ 60/562; 60/588; 60/589
[58] Field of Search ......................... 60/562, 591, 585, 60/588, 589; 303/113.2, 901

[56] References Cited

U.S. PATENT DOCUMENTS

| | | |
|---|---|---|
| 3,216,194 | 11/1965 | Yardley . |
| 4,417,445 | 11/1983 | Furuta . |
| 4,688,382 | 8/1987 | Farr . |
| 4,838,619 | 6/1989 | Ocvirk ................................. 60/589 X |
| 4,922,120 | 5/1990 | Becker et al. ........................ 60/562 X |
| 4,979,426 | 12/1990 | Schiel et al. . |
| 5,013,096 | 5/1991 | Ocvirk et al. . |
| 5,056,313 | 10/1991 | Venetos et al. ....................... 60/589 X |
| 5,161,375 | 11/1992 | Crumb et al. ......................... 60/589 X |
| 5,456,525 | 10/1995 | Kosarski ............................. 303/113.2 |

FOREIGN PATENT DOCUMENTS

| | | |
|---|---|---|
| 796020 | 12/1976 | U.S.S.R. . |
| 822876 | 11/1959 | United Kingdom ..................... 60/589 |
| 2017357 | 10/1992 | WIPO ................................ 303/113.2 |

Primary Examiner—Hoang Nguyen
Attorney, Agent, or Firm—Brooks & Kushman P.C.

[57] ABSTRACT

A traction control low-restriction check valve for use in a compensating port master cylinder used with a traction control system and an antilock braking system. The check valve is a poppet valve mounted in a primary piston of the master cylinder. The popper valve is resiliently biased in a sealing position but allows brake fluid to be drawn by a traction control pump from a brake fluid reservoir against the resilient bias when the primary piston is not being translated to increase brake fluid pressure within the master cylinder.

18 Claims, 2 Drawing Sheets

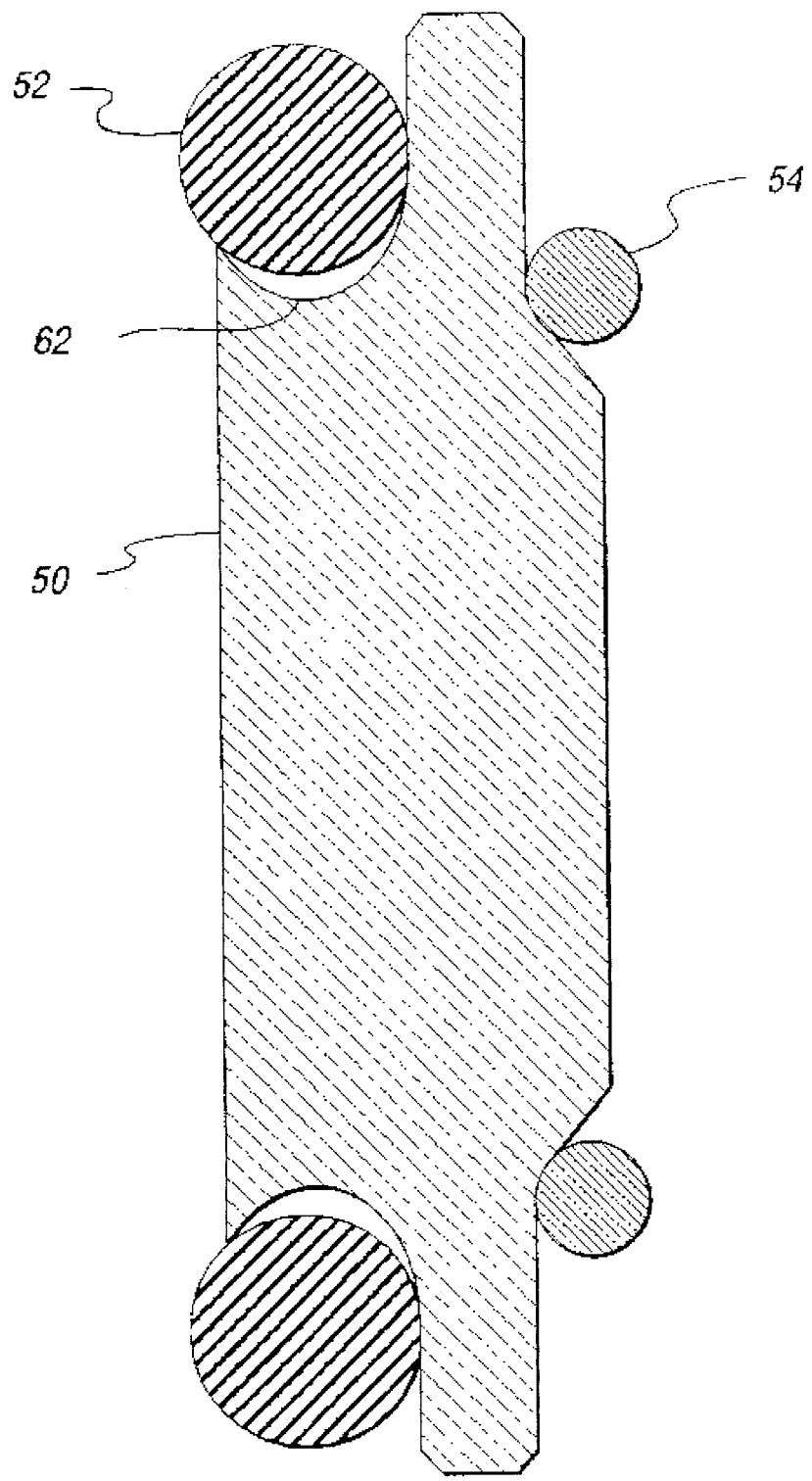

VEHICULAR BRAKING SYSTEM HAVING A LOW-RESTRICTION MASTER CYLINDER CHECK VALVE

TECHNICAL FIELD

This invention relates generally to check valves used in the master cylinder of a vehicular braking system and specifically to low-restriction check valves used to provide traction control access to reservoir brake fluid through compensating master cylinders.

BACKGROUND ART

Two demands are placed on a master cylinder used with a traction control system that brakes driven wheels to control slip. The first demand is that provision must be made to allow the traction control system to draw brake fluid through the master cylinder from a fluid reservoir. The second demand is that provision must be made to allow braking when the system is in an active traction control mode, especially when being used with an antilock braking system (ABS).

Tandem master cylinders are often used in this application to provide adequate hydraulic pressure and to provide braking if a portion of a braking subsystem fails. They must also perform additional functions, which include maintaining zero pressure on each brake when no force is being applied to an associated brake pedal. To meet this objective, compensation ports are used to connect the fluid reservoir with master cylinder pressure chambers. This compensates for the expansion of brake fluid in wheel brake circuits as fluid temperature rises. As the fluid expands, it simply flows into the reservoir to maintain zero pressure on the brakes.

Fluid transferred from the master cylinder pressure chambers to the wheel brake circuits as brake pads and other parts wear must also be replaced. The compensation ports provide the means for meeting this objective. Communication between the fluid reservoir and the master cylinder pressure chambers must, of course, be discontinued during actuation of the master cylinder to allow fluid pressure to be increased. This objective is met by valve action in the master cylinder.

This valve action takes place when the tandem pistons of the master cylinder have been actuated sufficiently to translate respective seals, usually lip seals, mounted thereon past the compensation ports, thereby isolating the pressure chambers from the fluid reservoir. The force that initiates this translation is communicated from the primary to the secondary piston by a pretensioned piston return spring disposed therebetween. Once the seals have been translated past the compensation ports, the force is communicated between the pistons by fluid pressure therebetween. Communication through the compensation ports is restored when force is removed from the brake pedal and the pistons are urged back to their original positions by forces generated by pressurized brake fluid and piston return springs.

To obtain advantages attending being able to draw brake fluid from a master cylinder brake fluid reservoir through the master cylinder for use in a traction control system, previous devices have used master cylinders having relatively complex and expensive center port designs. In addition to being more complex, such designs often use metallic valves and seats, which are more sensitive to contamination than are valves having resilient seals.

Such designs are supplanted by the traction control low-restriction check valve of the present invention, which provides a free path through a compensating port master cylinder without requiring an expensive center port master cylinder.

While the prior devices function with a certain degree of efficiency, none include the advantages attending the use of the traction control low-restriction master cylinder check valve of the present invention, as is hereinafter more fully described.

Further, in prior ABS systems, and particularly those including traction control, the higher fluid pressures created by these systems, where they are fed back into the master cylinder, have made desirable the design feature of minimizing the clearance between the primary and secondary pistons and the housing to preclude undesirable distortion of the elastomeric lip-type fluid seal. Unfortunately, minimizing this clearance undermines being able to "pump up" the brakes as is sometimes desirable to eliminate a soft pedal feel should any appreciable amount of air become entrained in the system. It is this clearance through which the make-up fluid flows from the reservoir to the primary/secondary pressure chamber.

DISCLOSURE OF THE INVENTION

The present invention contemplates providing traction control access to reservoir brake fluid through a conventional compensating port master cylinder.

The present invention further contemplates a check valve having a low cracking pressure and providing low flow restriction access through the conventional compensating port master cylinder to a brake fluid reservoir.

The present invention also contemplates eliminating the necessity of using a traditional and relatively expensive center port master cylinder.

The present invention also allows for maintaining the close clearance between the housing and piston(s) and providing a supplemental fluid path to the pressure chamber to maintain the ability of the master cylinder to quickly "pump up".

In realizing the aforementioned and other objects, features and advantages, the traction control, low-restriction check valve of the present invention includes a poppet valve, a resilient seal and a resilient spring.

The compensating port master cylinder in which the check valve of the present invention is used typically includes an elongate housing having a main bore extending along a central axis between an open end and a closed end of the housing. A primary piston, having a leading end and a trailing end, is slidably disposed within the main bore. A secondary piston is also slidably disposed within the main bore between the primary piston and the closed end of the housing. A primary pressure chamber is defined between the primary piston and the secondary piston, and a secondary pressure chamber is defined between the secondary piston and the closed end of the housing. The primary and secondary pistons are each slidable between unstroked and stroked positions.

The housing defines therein a primary inlet passage, a primary compensating port, and a traction control outlet passage. The primary inlet passage and the primary compensating port connect to a brake fluid reservoir, and the traction control outlet passage connects to a traction control pump. The primary compensating port is also in communication with the primary pressure chamber only during a compensation cycle, when the piston is in its unstroked position. The traction control outlet passage is in continuous communication with the primary pressure chamber.

The primary piston defines therein a peripheral annular recess that is in continuous communication with the primary inlet passage, and an axial recess is defined in the leading end of the piston. The primary piston also defines therein a lateral interior passage communicating with the annular recess and a longitudinal interior passage extending between the lateral interior passage and the axial recess, the latter being in continuous communication with the primary pressure chamber. The area of the primary piston surrounding the orifice of the longitudinal interior passage where it intersects the axial recess forms a valve seat for the check valve.

The check valve includes a popper valve that is axially translatable within the axial recess. A resilient poppet valve seal is supported by the poppet valve, and at least a portion of the resilient seal is proud of the poppet valve toward the passageway. A poppet valve spring is disposed within the axial recess to resiliently bias the poppet valve toward its valve seat. The poppet valve seal isolates the longitudinal passage from the axial recess but allows brake fluid to be drawn by the traction control pump from the brake fluid reservoir, against the bias of the popper valve spring, when the primary piston is not being translated toward the closed end of the housing, that is, toward its stroked position, to increase brake fluid pressure in the primary pressure chamber.

A retaining member is disposed on the leading end of the primary piston and extends into the axial recess thereof. The poppet valve spring extends from the popper valve to the retaining member, the tension of the popper valve spring maintaining the popper valve in a sealing position. The popper valve spring is a helical spring having a first end fixedly located by the retaining member within the axial recess and a second end axially translatable with the popper valve.

The poppet valve has a generally disk-shaped configuration and has a periphery that is undercut to form an annular recess. The resilient seal is an O-ring disposed in the annular recess in the poppet valve and is sealingly compressed between the poppet valve and the primary inlet valve seat by the popper valve spring when the primary piston has not been translated toward the piston and by the primary inlet valve spring when the primary piston has been so translated. The annular recess in the popper has a partially radiused cross section, the radius of which is slightly smaller than that of a cross section of the O-ring, to receive and retain the O-ring.

The objects, features and advantages of the present invention are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein:

FIG. 2 is a sectional view of the poppet valve and of the valve seal of the present invention.

BEST MODE FOR CARRYING OUT THE INVENTION

Figure 1:
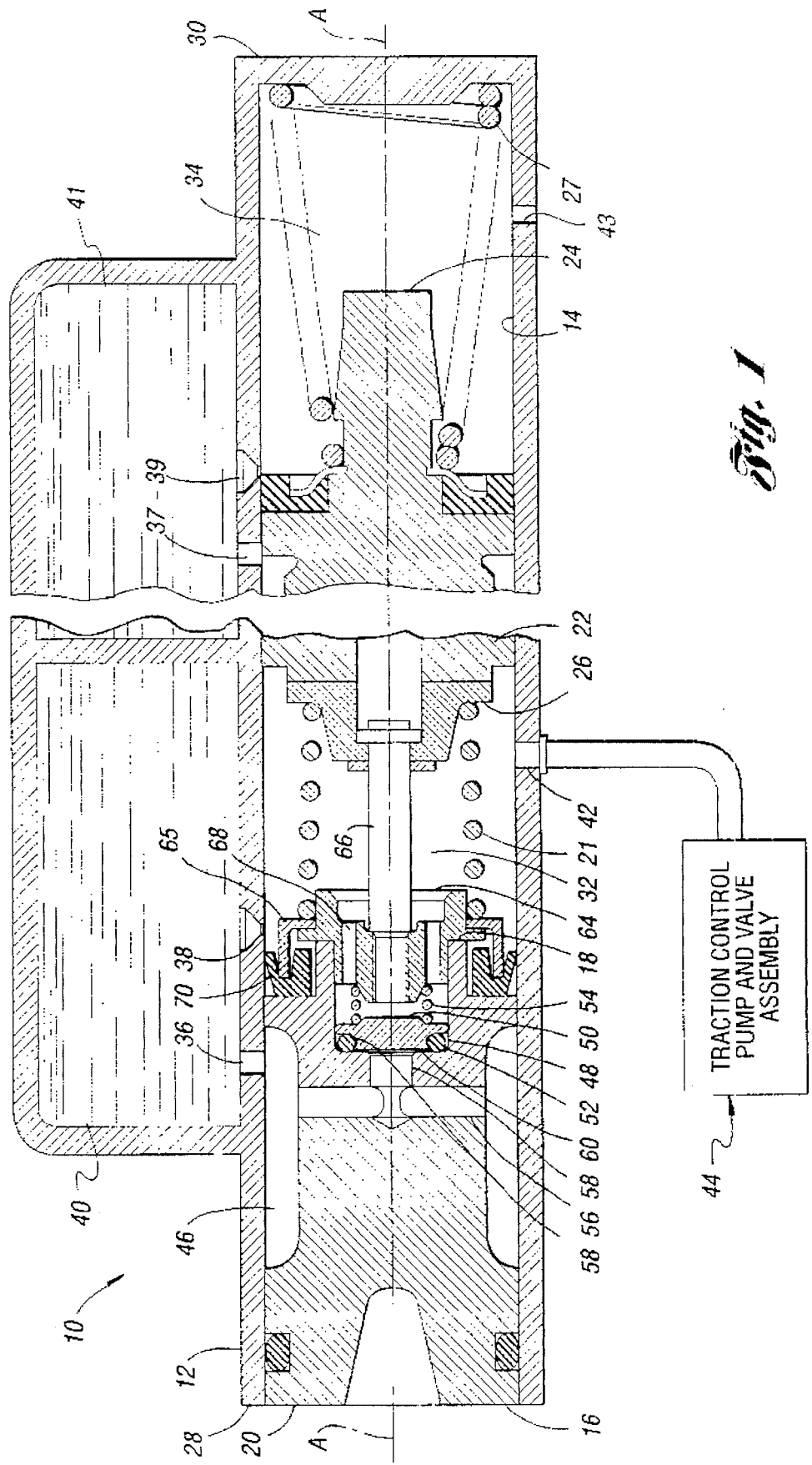
FIG. 1 is a sectional elevation view of a compensating port master cylinder incorporating the present invention.

FIG. 1 of the drawings shows the present invention as it might typically be incorporated in a compensating port master cylinder connected to a brake fluid reservoir and to a traction control pump. The compensating port master cylinder 10 includes an elongate housing 12 having a main bore 14 extending along a central axis A-A between an open end 28 and a closed end 30 of the housing 12.

A primary piston 16 is slidably disposed within the main bore 14. The primary piston 16 has a leading end 18 and a trailing end 20 and is slidable between unstroked and stroked positions. A secondary piston 22, also having a leading end 24 and a trailing end 26, is slidably disposed within the main bore 14 between the primary piston 16 and the closed end 30 of the housing 12, and it is also slidable between unstroked and stroked positions. A primary piston spring 21 extends from the primary piston 16 to the secondary piston 22, and a secondary piston spring 27 extends from the secondary piston 22 to the closed end 30 of the housing 12.

A primary pressure chamber 32 is defined within the main bore 14 between the leading end 18 of the primary piston 16 and the trailing end of the secondary piston 22. A secondary pressure chamber 34 is defined between the leading end of the secondary piston 22 and the closed end 30 of the housing 12. The primary and secondary pistons, 16 and 22, are shown in their unstroked positions in FIG. 1. Brake fluid pressure is increased in the primary and secondary pressure chambers, 32 and 34, when the primary and secondary pistons, 16 and 22, are translated toward their stroked positions, that is, toward the closed end 30 of the housing 12.

The housing 12 defines therein a primary inlet passage 36 that connects to a brake fluid reservoir 40. A primary compensating port 38 is also defined in the housing 12, and it also connects to the brake fluid reservoir 40. Similarly separate brake fluid reservoir 41 includes a secondary inlet passage 37 and compensating port 39. A traction control outlet passage 42, which connects to a traction control pump and valve assembly, generally designated 44, is also defined in the housing 12 and in fluid communication with the primary pressure chamber 32. During a compensating cycle, when the primary piston 16 is in its unstroked position, the primary compensating port 38 is also in communication with the primary pressure chamber 32. When the primary piston 16 has begun to be translated away from its unstroked position, a primary piston lip seal 70 passes across the primary compensating port, isolating the primary pressure chamber 32 from the brake fluid reservoir 40. The traction control outlet passage 42 is in continuous communication with the primary pressure chamber 32 corresponding brake outlet passage 43 is in communication with pressure chamber 32. A corresponding brake outlet passage 43 is in communication with pressure chamber 32.

Medially defined within the primary piston 16 is a peripheral annular recess 46. The peripheral annular recess 46 has a sufficient longitudinal dimension to provide continuous communication with the primary inlet passage 36 at all positions of the piston 16. An axial recess 48 is defined in the leading end 18 of the primary piston 16 and is in continuous communication with the primary pressure chamber 32.

The primary piston 16 also defines therein a passageway communicating between the peripheral annular recess 46 and the axial recess 48. The passageway includes a lateral interior passage 56 and a longitudinal interior passage 58. The lateral interior passage 56 extends between diametrically opposed points in the peripheral annular recess 46, and the longitudinal interior passage 58 provides communication between the lateral interior passage 56 and the axial recess 48. A valve seat 60 for the check valve is defined by the area of the primary piston 16 surrounding the orifice of the longitudinal interior passage 58 where it intersects the axial recess 48 in the housing 12.

The check valve includes a poppet valve 50, which is axially translatable within the axial recess 48. A resilient popper valve seal 52 is supported by the poppet valve 50. At least a portion of the resilient popper valve seal 52 extends from the poppet valve 50 toward the valve seat 60. A poppet valve return spring 54 is disposed within the axial recess 48 to resiliently bias the popper valve 50 toward the valve seat 60. The popper valve return spring 54 is typically a helical spring and resiliently maintains the popper valve 50 in a sealing position when no brake fluid is being drawn by the traction control pump 44.

A retaining member 64 is mounted on the leading end 18 of the primary piston 16. A portion of the retaining member 64 slidingly extends partway into the axial recess 48 of the primary piston 16, laterally locating the popper valve spring 54 at a first end thereof and anchoring it while leaving a second end of the poppet valve spring 54 free to axially translate with the poppet valve 50. The retaining member 64 also anchors the free end of a secondary valve stem 66. The retaining member 64 defines apertures 68 therethrough to allow an unrestricted flow of brake fluid from the axial recess 48 of the primary piston 16 to the primary pressure chamber 32. Fitted over the retaining member 64 is an annular seal retention member 65 held against a radially extending collar on retaining member 64 by the primary piston spring 21. Seal retention member 65 includes a cylindrical axially extending flange fitted within an annular recess in lip type seal 70, and thereby retaining seal 70 in place against the primary piston with the seal lip engaging the internal walls of housing 12 defining primary pressure chamber 32.

The clearance between the pistons 16,18 and the respective pressure chambers 32,34 is maintained at a minimum in the ABS and ABS/TC systems so that any tendency of the seal 70 to extrude into the clearance between the housing 12 and piston during the pump-on sequence is precluded.

The poppet valve 50 has a generally diskshaped configuration. Its outer diameter is only slightly less than that of recess 48 so as to maintain the valve in proper orientation within the recess. Its circular periphery is undercut to form a valve annular recess 62. The resilient poppet valve seal 52 is typically an O-ring disposed in the valve annular recess 62. The valve annular recess 62 has a partially radiused cross section to retain the O-ring in position. As illustrated by FIG. 2, the radius of the partially radiused portion of the valve annular recess 62 is slightly less than that of the cross section of the O-ring, and a portion of the O-ring extends from the poppet valve toward the valve seat 60.

The poppet valve 50 controls brake fluid flow between the longitudinal interior passage 58 and the axial recess 48. When brake fluid is needed for traction control, vacuum is provided by the traction control pump 44. If the primary piston 16 is not being translated toward, or has not been translated to, its stroked position, the vacuum is sufficient to pull the poppet valve 50 away from its valve seat 60. This allows brake fluid to be drawn from the reservoir 40, through the primary inlet passage 36, through the peripheral annular recess 46, through the lateral interior passage 56, through the longitudinal interior passage 58, past the poppet valve 50, through the axial recess 48, through the primary pressure chamber 32, and through the outlet passage 42 to the traction control pump 44.

Whenever the primary piston 16 is being translated toward, or has been translated to, its stroked position, brake fluid pressure created thereby in the primary pressure chamber 32 overpowers any vacuum created by the traction control pump 44. This prevents the latter from drawing any brake fluid past the poppet valve 50 until brake fluid pressure is relieved. The control valve, i.e. the primary valve or normally closed solenoid valve, will simultaneously be actuated to close the draw of the traction control pump from the master cylinder, as is conventional and well known to those skilled in the art.

Since the force exerted by the poppet valve spring 54 need not maintain the poppet valve 50 in a closed position against any appreciable opposing forces, it can be relatively low. This provides a check valve with the advantage of having a relatively low cracking pressure. Since the path of brake fluid drawn from the brake fluid reservoir 40 does not include restricted ports, such as the primary compensating port 38, this provides a check valve with the additional advantage of having relatively low flow restriction.

Further, should the operator determine that the brakes need to be pumped up, as when air may be entrained in the system from a poor bleed job or operating the vehicle over rough roads for an extended period of time, the flow of hydraulic fluid from the reservoir 40 through port 36, recess 46, interior passage 58 and thence beyond poppet valve to chamber 32 allows the master cylinder to be quickly pumped up. This supplemental flow path eliminates the need for relying solely on the flow of brake fluid through the close clearance between piston 16 and housing 12.

The same poppet valve/piston assembly may be provided for secondary piston 22 to enhance the overall ability to pump up the master cylinder in the manner described. Further, if the secondary piston is constructed in such manner, one has the option of tapping the traction control pump and valve assembly 44 off of the secondary pressure chamber 34.

While the best mode for carrying out the invention has been described in detail, those familiar with the art to which this invention relates will recognize various alternative designs and embodiments for practicing the invention as defined by the following claims.

What is claimed is:

1. A traction control low-restriction check valve for use in a compensating port master cylinder including an elongate housing having a main bore within which a primary piston, having a leading end and a trailing end, is slidably disposed, and within which a secondary piston is also slidably disposed, the primary and secondary pistons each being translatable between an unstroked and a stroked position, the housing having an open end and a closed end, a pressure chamber being defined between the following members selected from the group consisting of one of said pistons and the end of the housing, and between the primary piston and the secondary piston, the housing defining therein a primary inlet passage and a primary compensating port, both connectable to a brake fluid reservoir, and a traction control outlet passage connectable to a traction control pump, the primary piston defining therein a peripheral annular recess in continuous communication with the primary inlet passage, an axial recess defined in the leading end of the primary piston, and a passageway communicating between the annular recess and the axial recess, the primary compensating port communicating with the pressure chamber only when the primary piston is in its unstroked position, the check valve comprising:

a poppet valve axially translatable within the axial recess;

a resilient poppet valve seal supported by the poppet valve, at least a portion of the resilient seal extending from the poppet valve toward the passageway; and resilient biasing means disposed within the axial recess to resiliently bias the poppet valve toward the passageway, the poppet valve seal isolating the passageway from the axial recess but allowing brake fluid to be drawn by the traction control pump from the brake fluid reservoir against the bias of the resilient biasing means when the primary piston is in its unstroked position and not translated toward the closed end of the housing to increase pressure in the pressure chamber.

2. The check valve as defined by claim 1, wherein the passageway comprises:

a lateral interior passage extending inwardly from the peripheral annular recess; and a longitudinal interior passage extending between the lateral interior passage and the axial recess.

3. The check valve as defined by claim 2, wherein the primary piston defines a valve seat therein immediately surrounding the longitudinal interior passage where it intersects the axial recess.

4. The check valve as defined by claim 3, wherein:

the poppet valve has a generally disk-shaped configuration having a periphery undercut to form an annular recess; and the resilient poppet valve seal is an O-ring disposed in the annular recess in the poppet valve and is sealingly compressed when the poppet valve is forced against the valve seat by the resilient biasing means.

5. The check valve as defined by claim 4, wherein the annular recess has a partially radiused cross section to receive and retain the O-ring.

6. The check valve as defined by claim 5, wherein the partially radiused cross section has a radius slightly smaller than that of a cross section of the O-ring.

7. The check valve as defined by claim 1, wherein the master cylinder further includes a retaining member fixedly disposed within the axial recess proximate the leading end of the primary piston and wherein the resilient biasing means is a helical spring extending between the retaining member and the poppet valve.

8. A compensating port master cylinder for use with a vehicle traction control system, the master cylinder comprising:

an elongate housing having an open end and a closed end and defining therebetween a main bore, the elongate housing defining therein a primary inlet passage and a primary compensating port, both connectable to a brake fluid reservoir, and an outlet passage connectable to a traction control pump;

a primary piston slidably disposed within the main bore, having a leading end and a trailing end, said primary piston being translatable in the direction of its leading end between an unstroked position and a stroked position, the primary piston having provided therein a passageway in continuous communication with the primary inlet passage;

a primary pressure chamber being defined at the leading end of the primary piston, the primary pressure chamber being in continuous communication with the outlet passage, the primary compensating port communicating with the primary pressure chamber only when the primary piston is in its unstroked position;

a normally closed, resiliently biased poppet valve disposed within the primary piston to inhibit brake fluid flow between the passageway and the primary pressure chamber unless brake fluid is being drawn by a traction control pump while the primary piston is not translated toward the closed end of the housing which reduces the pressure in the primary pressure chamber.

9. The compensating port master cylinder as defined by claim 8, wherein the primary piston has a peripheral annular recess in continuous communication with the primary inlet passage, an axial recess provided in the leading end, a lateral interior passage extending inwardly from the peripheral annular recess, and a longitudinal interior passage connecting the lateral interior passage to the axial recess, and wherein the valve is axially translatable within the axial recess.

10. The compensating port master cylinder as defined by claim 9, further comprising:

a secondary piston slidably disposed within the main bore between the primary piston and the closed end of the housing;

said primary pressure chamber being defined between the primary piston and secondary piston;

a helical spring disposed within the axial recess to resiliently bias the poppet valve;

a resilient valve seal supported by the poppet valve, at least a portion of the resilient seal extending from the valve toward the passageway.

11. The compensating port master cylinder as defined by claim 10, further including a retaining member fixedly disposed within the axial recess displaced from the poppet valve, the helical spring having a first end resiliently biased against the retaining member and a second end axially translatable with the poppet valve.

12. The compensating port master cylinder as defined by claim 10, wherein the longitudinal interior passage is coaxial with the axial recess, the bottom of the axial recess defines a valve seat immediately surrounding the longitudinal interior passage where it intersects the axial recess.

13. The compensating port master cylinder as defined by claim 11, wherein:

the poppet valve has a generally disk-shaped configuration having a periphery undercut to form an annular recess; and the resilient seal is an O-ring disposed in the annular recess which is sealingly compressed when the poppet valve is forced against the valve seat by the resilient biasing means.

14. The compensating port master cylinder as defined by claim 12, wherein the annular recess in the poppet has a partially radiused cross section to receive and retain the O-ring.

15. The compensating port master cylinder as defined by claim 13, wherein the partially radiused cross section of the annular recess in the poppet has a radius slightly smaller than that of a cross section of the O-ring.

16. A compensating port master cylinder for use with a vehicle traction control system, the master cylinder comprising:

an elongate housing having an open end and a closed end and defining therebetween a main bore, the housing has a primary inlet passage and a primary compensating port, both connectable to a brake fluid reservoir, and an outlet passage connectable to a traction control pump;

a primary piston having a leading end and a trailing end and being slidably disposed within the main bore, the primary piston having a peripheral annular recess in continuous communication with the primary inlet passage, an axial recess provided in the leading end, at least one interior passage connecting the annular recess to the axial recess, a secondary piston slidably disposed within the main bore between the primary piston and the closed end of the housing, a primary pressure chamber being defined within the main bore between the primary piston and the secondary piston, the brake fluid reservoir and the primary pressure chamber communicating through the primary compensating port only when the primary piston is in its unstroked position;

a retaining member mounted in said axial recess proximate the leading end of the primary piston;

a poppet valve axially translatable within the axial recess;

a resilient seal supported by the poppet valve, at least a portion of the resilient seal extending from the poppet valve toward the interior passage; and a helical spring extending between the retaining member and the poppet valve, the helical spring having a first end resiliently biased against the retaining member and a second end axially translatable with the poppet valve, the resilient seal inhibiting a fluid flow from the axial recess to the internal passage but allowing fluid to be drawn by the traction control pump from the brake fluid reservoir against the bias of the helical spring.

17. In a compensating port master cylinder including an elongate housing having a main bore within which a primary piston, having a leading end and a trailing end, is slidably disposed, and within which a secondary piston is also slidably disposed, the primary and secondary pistons each being translatable between an unstroked and a stroked position, the housing having an open end and a closed end, a pressure chamber being defined between at least one of said pistons and the housing, the housing further having an inlet passage and a compensating port, both connectable to a brake fluid reservoir, one of said first and second pistons having provided therein a peripheral annular recess in continuous communication with the inlet passage, an axial recess defined in the leading end of said one of said first and second pistons, and a passageway communicating between the annular recess and the axial recess, the compensating port communicating with the pressure chamber only during a compensation cycle, a check valve assembly comprising:

a poppet valve axially translatable within the axial recess;

a resilient seal supported by the poppet valve, at least a portion of the resilient seal extending from the poppet valve toward the passageway; and resilient biasing means disposed within the axial recess to resiliently bias the poppet valve toward the passageway, the resilient seal isolating the passageway from the axial recess but allowing brake fluid to be drawn from the brake fluid reservoir against the bias of the resilient biasing means when the pressure in the pressure chamber is reduced to a value less than that of the reservoir to overcome the bias of the resilient biasing means on the poppet valve.

18. The master cylinder of claim 17 wherein each of said primary and secondary pistons includes a respective one of said check valve assembly.

* * * * *

UNITED STATES PATENT AND TRADEMARK OFFICE
CERTIFICATE OF CORRECTION

PATENT NO. : 5,542,253
DATED : August 6, 1996
INVENTOR(S) : Blaise J. Ganzel

Page 1 of 3

It is certified that error appears in the above-indentified patent and that said Letters Patent is hereby corrected as shown below:

In Column 1, line 14, delete " - " between the words "are" and "placed".

In Column 3, line 13, delete the word "popper" and insert therein -- poppet --.

In Column 3, line 21, delete the word "popper" and insert therein -- poppet --.

In Column 3, line 28, delete the word "popper" and insert therein -- poppet --.

In Column 3, line 29, delete the word "popper" and insert therein -- poppet --.

In Column 3, line 30, delete the word "popper" and insert therein -- poppet --.

In Column 3, line 31, delete the word "popper" and insert therein -- poppet --.

In Column 3, line 33, delete the word "popper" and insert therein -- poppet --.

UNITED STATES PATENT AND TRADEMARK OFFICE
CERTIFICATE OF CORRECTION

PATENT NO. : 5,542,253
DATED : August 6, 1996
INVENTOR(S) : Blaise J. Ganzel

It is certified that error appears in the above-indentified patent and that said Letters Patent is hereby corrected as shown below:

In Column 3, line 40, delete the word "popper" and insert therein -- poppet --.

In Column 3, line 43, delete the word "popper" and insert therein -- poppet --.

In Column 5, line 6, delete the word "popper" and insert therein -- poppet --.

In Column 5, line 7, delete the word "popper" and insert therein -- poppet --.

In Column 5, line 10, delete the word "popper" and insert therein -- poppet --.

In Column 5, line 11, delete the word "popper" and insert therein -- poppet --.

In Column 5, line 12, delete the word "popper" and insert therein -- poppet --.

In Column 5, line 17, delete the word "popper" and insert therein -- poppet --.

UNITED STATES PATENT AND TRADEMARK OFFICE
CERTIFICATE OF CORRECTION

PATENT NO. : 5,542,253
DATED : August 6, 1996
INVENTOR(S) : Blaise J. Ganzel

Page 3 of 3

It is certified that error appears in the above-indentified patent and that said Letters Patent is hereby corrected as shown below:

In Column 6, line 23, after the word "valve", insert the number --50--.

Signed and Sealed this

Fifteenth Day of April, 1997

Attest:

BRUCE LEHMAN

Attesting Officer

Commissioner of Patents and Trademarks